Patented Nov. 15, 1927.

1,648,986

UNITED STATES PATENT OFFICE.

TOM FREDERICK GRAY, OF STOCKPORT, ENGLAND.

VALVE.

Application filed February 25, 1926, Serial No. 90,647, and in Great Britain May 5, 1925.

This invention relates to valves for the control of steam and other fluid under considerable pressure, and has for its object to provide improved means for the by-passing of such fluid to equalize the pressures on the valve seat or seats and thus facilitate the valve opening and closing movements.

Figure 1:
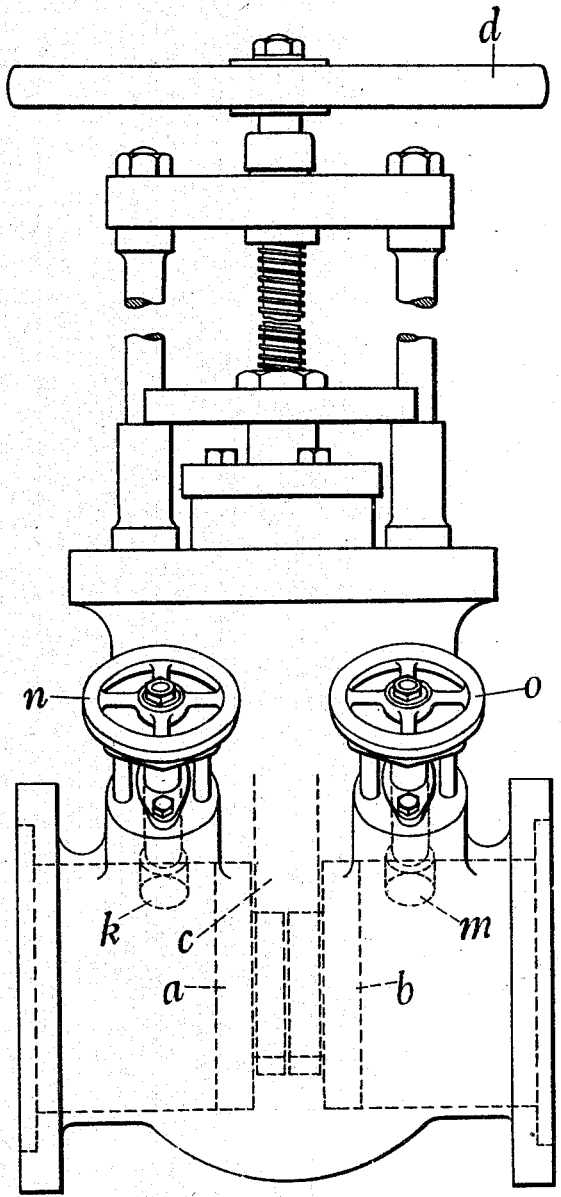
Figure 2:
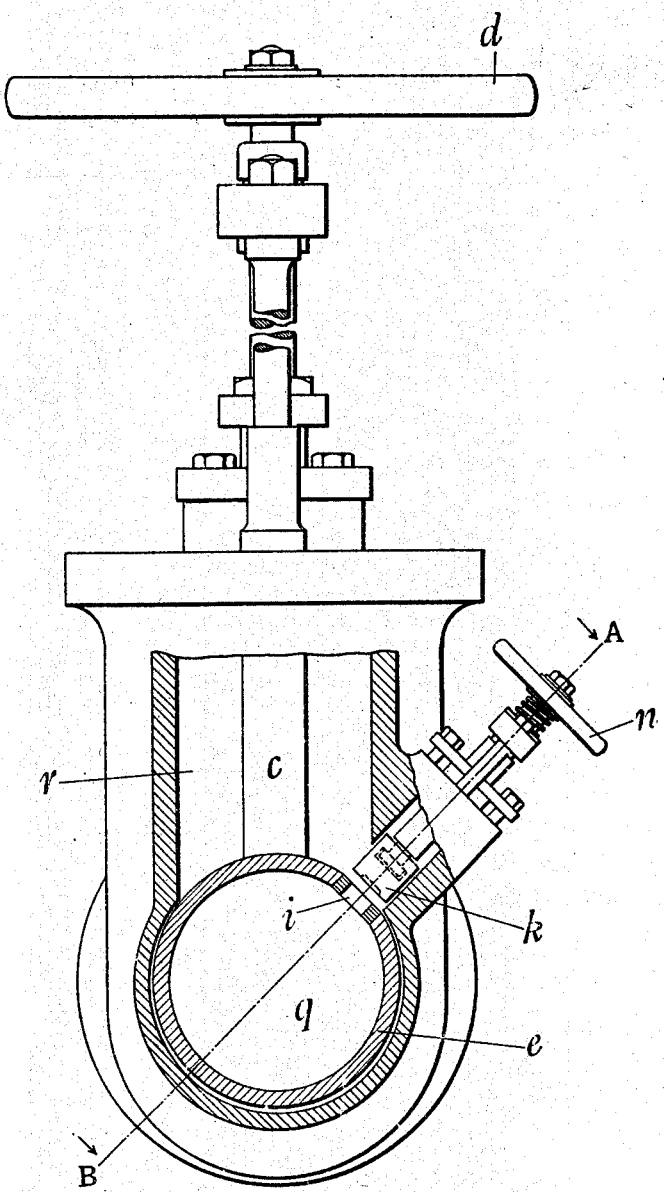
Figure 3:
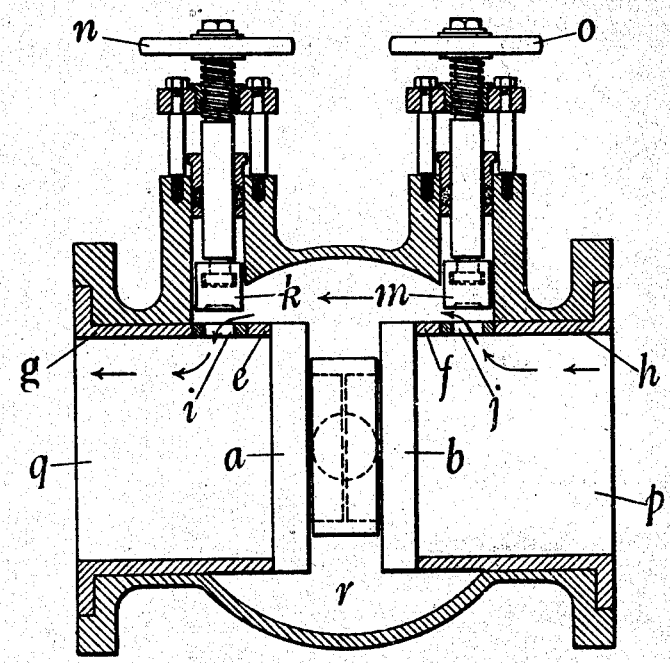

Figure 1 is an elevation, Figure 2 an end view with part in section, and Figure 3 a sectional plan on the line A—B of Figure 2, illustrating a valve constructed in accordance with this invention.

The same reference letters in the different views indicate the same or similar parts.

The valve shown in the drawings is a parallel slide or full way valve having two valve discs, $a$, $b$ operated by a trunk or hollow spindle $c$ engaged by the screwed stem of the hand wheel $d$, the valve seats $e$ and $f$ being formed by the ends of the sleeves $g$, $h$, inserted in the valve ways or by annular parts secured to said ends. In each of the said sleeves $g$, $h$ there is a port as $i$ and $j$. Such ports provide connections or communications between the opposite sides of the aforesaid valve discs $a$ and $b$. The opening and closing of said communications is effected by the auxiliary valves $k$, $m$, which are operated by the hand wheels $n$, $o$. If, for example, the pressure fluid enters the valve way at $p$ and the valve discs $a$ and $b$ are closed, the outlet valve way $q$ can be put under the pressure in $p$ by opening the auxiliary valves $k$, $m$, for the fluid then passes through the valve body part $r$ as shown by the arrows at Figure 3. If desired, the valve $m$ may always be left open or be dispensed with, when the valve way $p$ is always the inlet of the valve. The presence of the pressure fluid in the valve body at $r$ serves to retain the valve discs $a$ and $b$ against their respective seats $e$ and $f$ and thus to prevent any chattering or slight lateral movements of the said discs during their opening and closing movements by the operation of the hand wheel $d$.

I claim:—

1. In valves, the combination comprising a valve body having inlet and outlet ways with a central chamber between them, sleeves in said ways projecting into the said chamber, valve discs abutting upon and movable between the ends of said sleeves, lateral apertures in the portions of said sleeves projecting into the said chamber, and means for opening and closing said apertures.

2. In valves, the combination comprising a casing having inlet and outlet ways with a central chamber between them, sleeves in said ways projecting into said chamber, valve discs fitting between the ends of said sleeves, means for imparting sliding movements to said discs, and lateral apertures in the portions of said sleeves projecting into the said chamber, said lateral apertures forming with the said chamber a by-pass between said inlet and outlet ways.

3. In valves, the combination comprising a casing having inlet and outlet ways with a central chamber between them, sleeves in said ways projecting into said chamber, valve discs fitting between the ends of said sleeves, means for imparting sliding movements to said discs, lateral apertures in the portions of said sleeves projecting into the said chamber, said lateral apertures forming with the said chamber a by-pass between said inlet and outlet ways, and means for opening and closing said by-pass.

In testimony whereof I have signed my name to this specification.

TOM FREDERICK GRAY.